June 14, 1960  G. L. ADAMS  2,940,740
MULTIPLE HEAD COAL MINING AUGER
Filed March 20, 1958  4 Sheets-Sheet 1

INVENTOR.
GEORGE L. ADAMS
BY
HIS ATTORNEY

June 14, 1960
G. L. ADAMS
2,940,740
MULTIPLE HEAD COAL MINING AUGER
Filed March 20, 1958
4 Sheets-Sheet 2
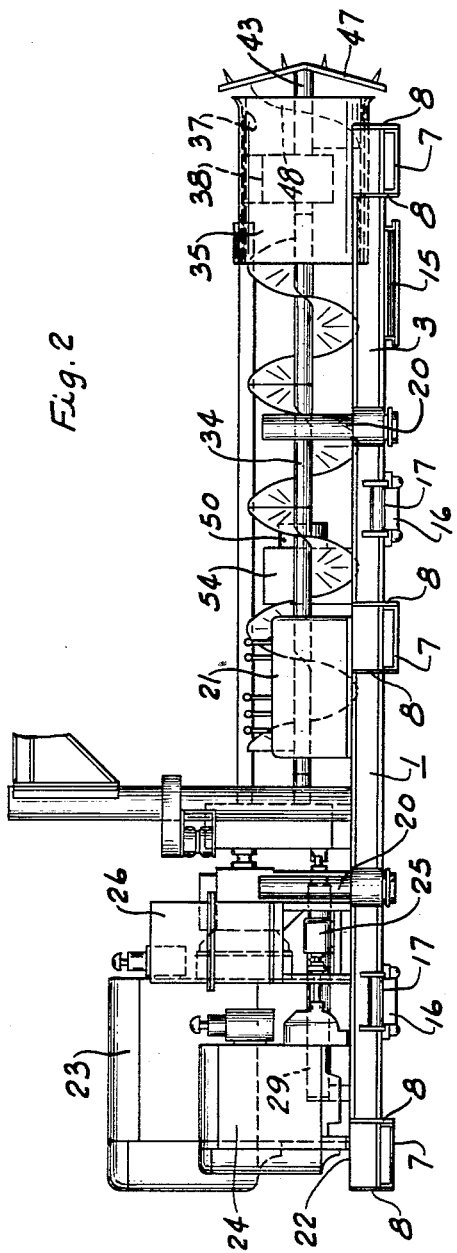
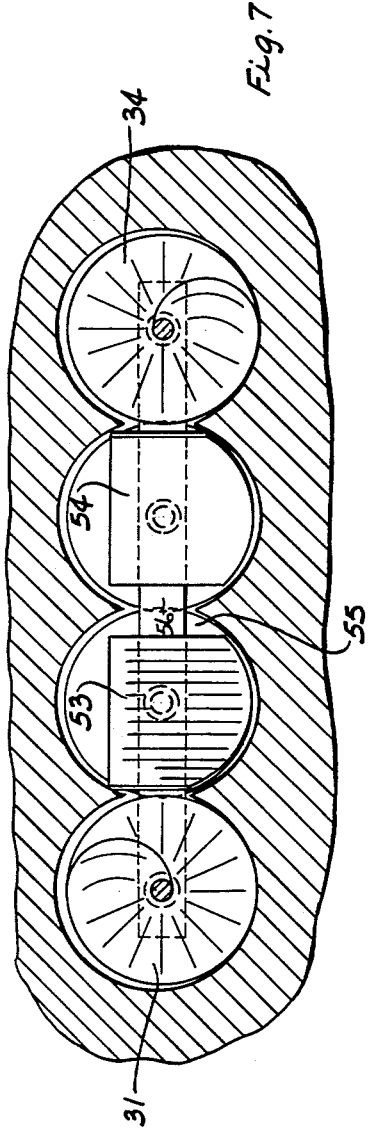
INVENTOR.
GEORGE L. ADAMS
BY
HIS ATTORNEY June 14, 1960  G. L. ADAMS  2,940,740
MULTIPLE HEAD COAL MINING AUGER
Filed March 20, 1958  4 Sheets-Sheet 3

INVENTOR.
GEORGE L. ADAMS
BY
HIS ATTORNEY

June 14, 1960 G. L. ADAMS 2,940,740
MULTIPLE HEAD COAL MINING AUGER
Filed March 20, 1958 4 Sheets-Sheet 4
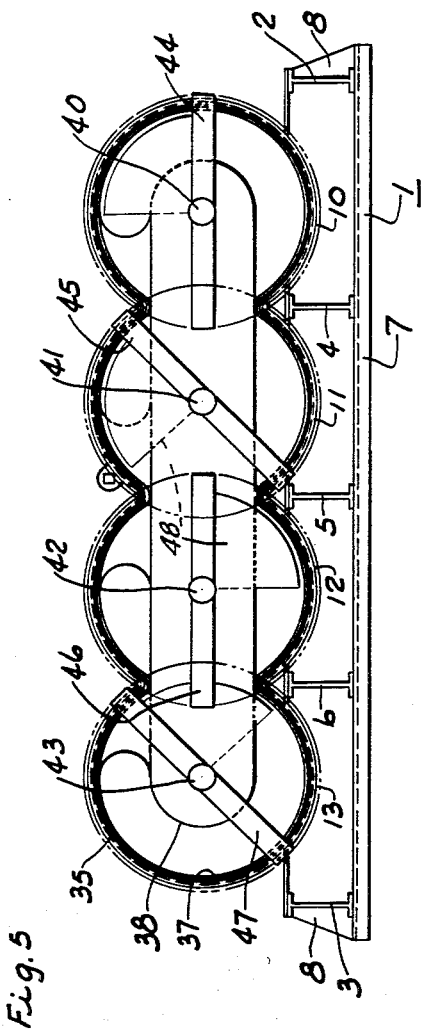
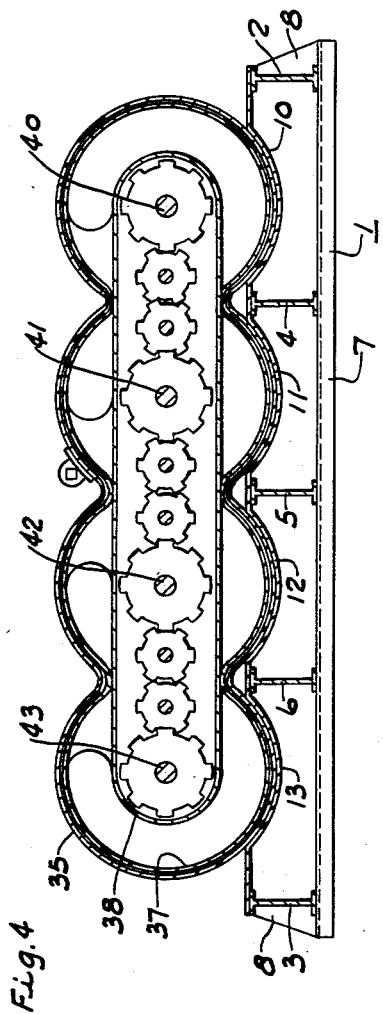
INVENTOR.
GEORGE L. ADAMS
BY
HIS ATTORNEY United States Patent Office 2,940,740
Patented June 14, 1960

2,940,740

MULTIPLE HEAD COAL MINING AUGER

George L. Adams, Salem, Ohio, assignor to The Salem Tool Company, Salem, Ohio, a corporation of Ohio Filed Mar. 20, 1958, Ser. No. 722,709

14 Claims. (Cl. 262—26)

This invention relates generally to coal augers and more particularly to coal augers having a multiple series of cutting heads.

Coal augering is known as punch mining and with a single auger having a cutting head of the appropriate size for mining a given seam of coal, the coal yield may be 70% or greater. This yield may be increased by increasing the number of cutting heads and auger strings.

The principal object of this invention is the provision of two spaced apart auger strings connected to drive three or more cutting heads. The two auger strings are preferably of opposite hand and spaced from each other.

Another object is the provision of a coal augering machine having four or more cutting heads propelled by spaced augering strings of opposite hand and a fixed length of auger sections extending rearwardly from each of the intermediate cutting heads to convey the freshly cut coal laterally to the outer auger strings which in turn convey the coal to the opening started by the augering cutting heads. This structure has limitations as to the number of cutting heads relative to the number of conveying auger strings. Where two auger strings are well loaded in conveying four cutting heads, it is necessary to add an additional conveying auger string for each additional cutting head added. Thus two auger strings function for three or four cutting heads but five cutting heads would require three auger strings. This avoids overloading the conveying strings. It is feasible to employ a conveying auger string for each cutter head but it is an unnecessary expenditure in auger sections and power when a less number of auger strings can do the work. The power transmitted through the auger strings to rotate the cutting heads and drive them into the coal still provides enough additional power to convey a full auger load of coal rearwardly.

The withdrawal of the head also functions as a clean-up leaving a clean hole of three, four or more auger widths as the case may be. The fixed length of the laterally conveying augers behind the intermediate cutting heads should move all of the coal to the outside auger strings. However, a plowboard trailing behind these fixed auger lengths will force the spillage to the outer auger strings. Adjacent plowboards have sufficient spacing therebetween to admit spillage when the cutting heads are withdrawn, however the augers should be turned to feed the coal back when the cutting heads are withdrawn. These are important features of this invention.

The rear of the fixed length lateral conveying augers may be joined together by a lateral bearing rod to keep them steady and from plowing into one another. This bearing rod may be replaced by one that includes not only the rear end of the fixed length lateral conveying augers but also the outer auger strings. Some types of coal may be readily conveyed laterally so that the fixed length augers need only be one auger section long before the bearing bar is inserted. Other characters of coal may require two or even three auger sections to transfer the coal laterally from behind the central cutter heads to the outer auger strings for conveying rearwardly.

The lateral boring rod which supports the rear end of the laterally conveying augers with the auger strings preferably includes the connecting timing gears between each of these auger sections rather than placing these timing gears immediately behind the rotary cutting members. This permits the use of small bearings to support each of the auger shafts in the stationary barrel immediately behind the cutting members to allow more room for the passage of coal rearwardly and by the time this coal passes under the lateral bearing rod containing the timing gears it is well distributed and will readily flow under this lateral bearing rod with its timing gears.

Other objects and advantages appear hereinafter in the following description and claims.

The accompanying drawings show for the purpose of exemplification without limiting the claims thereto certain practical embodiments illustrating the principles of this invention wherein:

Fig. 2 is a view in elevation of the structure shown in Fig. 1.

Fig. 4 is a sectional view taken on the line 4—4 of Fig. 1.

Fig. 5 is a view in front elevation of the head shown in Fig. 1.

Fig. 7 is a transverse sectional view in back of the cutting head taken on the line 7—7 of Fig. 3.

Figure 1:
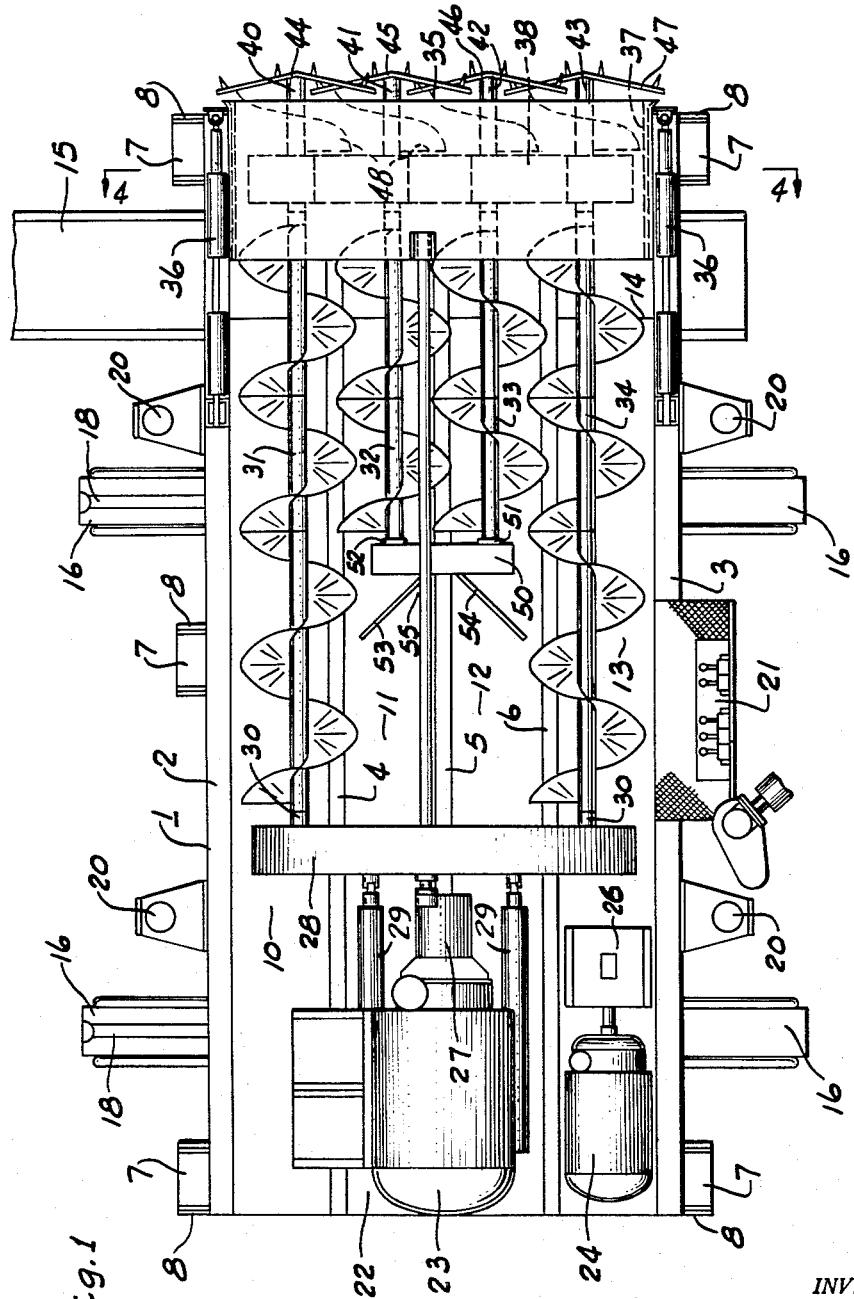
Fig. 1 is a plan view of the structure comprising this invention.

Referring to Figs. 1 and 2 of the drawings the multiple cutting head auger machine comprises the frame 1 made up of the outer parallel longitudinal rail members 2 and 3 and the intermediate rail members 4, 5 and 6, all of which are connected by the transverse channel members 7 directly joined to the bottoms of each of the longitudinal rail members. Gusset plates 8 connect the longitudinal members with the transverse channel members 7 and extend transversely of the machine having upper semicylindrical edges to receive and support the belly plates 10, 11, 12 and 13. These arcuate belly plates are provided with the transverse opening 14 adjacent the front of the machine through which the coal is dropped from the augers to the belt conveyor member 15 which may be extended to either side of the machine for the purpose of removing the coal from the vicinity of the machine. The conveyor 15 elevates the coal so that it may be transferred to another conveyor or to a truck or shuttle car for the purpose of removing the coal from the vicinity of the machine as disclosed in Compton 2,616,677.

As shown in Fig. 2 each mining machine has a pair of transverse skids 16 that are suspended on the underside of the frame 1 directly below the rollers 17 carried by the frame for the purpose of supporting the weight of the machine directly on the top surface of the skids. When the machine is resting on the ground the skids extend below the roller surface of the channel members 7. Each skid is provided with a double acting cylinder or jack member 18 to move the skid back and forth when the machine is not resting thereon or to move the machine thereon when it is resting on the skids and the skids are resting on the ground. With this arrangement the machine may be moved laterally in either direction or turned around and becomes quite mobile in a mining bench or pit.

When mining the machine frame 1 is preferably supported by the elevating jacks 20 of which there are four. These jacks elevate the machine so that the auger cutting heads are disposed to cut into the vein of coal. Frequently the ground is not level and requires substantial bracing support to move the augers into the coal which is obtained through the jacks 20. Each of the jacks is double acting and is independently controlled so as to provide the proper balance for leveling of the machine. Each of the controls for the jacks as well as the other machines is located at the operator's position indicated at 21.

The rear of the frame 1 supports the motor platform 22 on which is mounted the motor 23. This motor provides the power for driving the auger heads and a second motor 24 adjacent the operator's station is provided for supplying fluid under pressure to actuate the machine through each of the controls at the operator's station. The motor 24 operates the pump 25 which supplies fluid preferably hydraulic fluid under pressure to the fluid pressure tank 26 where it is distributed to the several motors through the valve control system.

The main motor 23 is connected through the reduction gear 27 to a crosshead gearbox 28 that provides a drive connection or coupling 30 for each of four of the augering units 31, 32, 33 and 34. Each of these drives is interconnected by driving gears within the gearbox 28 so as to operate in timed relation with each other. The gearbox 28 is moved back and forth by the double acting cylinders 29. The two auger units 31 and 32 on the left side of the machine are right hand auger units and are rotated when viewed from the front of the machine in a counterclockwise direction; whereas the auger units 33 and 34 on the right hand side of the machine have left hand auger flights and are rotated clockwise when viewed from the front of the machine. These auger units have their auger drive couplings 30 arranged so that when each auger section is inserted therein, it will be positioned so that it will not interfere with the adjacent auger when rotated.

The forward end of the machine frame 1 is provided with a guide barrel 35 which is slidable longitudinally on top of the frame 1 by means of the jack members 36 to move it against the coal face for guiding the auger heads as they enter the coal seam and to keep the high wall or roof from falling onto the coal being delivered by the augers. This guide member takes the form of the four auger members 31, 32, 33 and 34 each of which is overlapped to some degree as illustrated in Fig. 4. This auger guide 35 will always pass the nonrotary auger barrel member 37 and the auger units. The coal removed by the augers passes rearwardly through the guide 35 to the opening 14 dropping on the conveyor belt 15 from whence it is removed laterally from the machine.

The nonrotary auger barrel 37 which is similar to that shown in McCarthy 2,864,601 is provided with a transversely disposed gear housing 38 which interconnects each of the shafts 40, 41, 42 and 43 of the four rotary cutting heads 44, 45, 46 and 47 to maintain the same in timed relation at the forward end of the augering machine and in the same manner as that in the crosshead gearbox 28. Each of the shafts 40 to 43 are connected to each of the shafts making up the auger sections 31, 32, 33 and 34 respectively and couplings are provided on opposite sides of the gearbox 38 for detachably coupling cutting heads as well as the auger sections too. The auger sections 31 and 34 pass all the way back to the cross head gearbox 28 on the machine and represent the driving shafts for each of the four cutting heads as well as the means for returning the coal to the open pit or position where the machine 1 is located so that it may be conveyed laterally from the machine by the conveyor 15.

Figure 3:
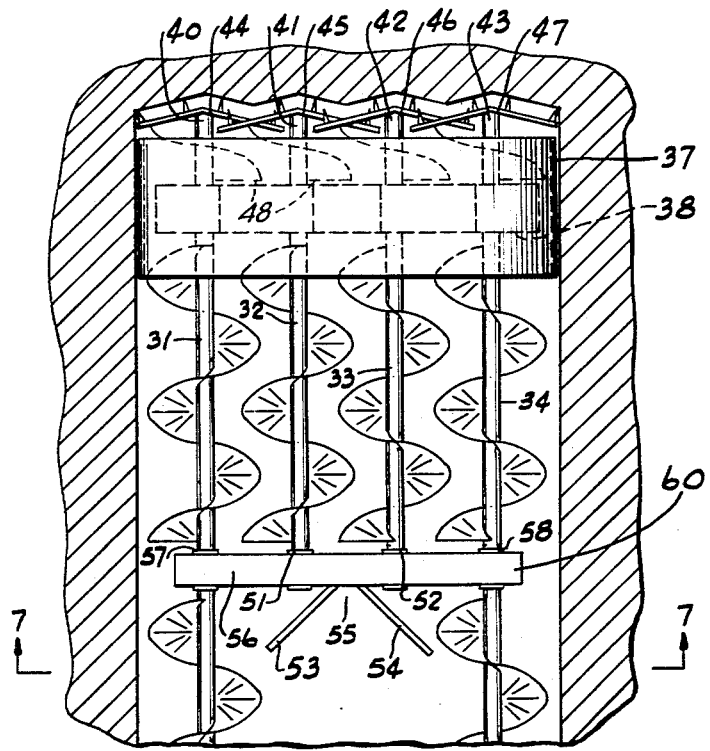
Fig. 3 is a plan view of a long bearing bar connecting the trailing ends of the fixed length lateral auger conveyors and the outer conveyor strings.

The cylinders 29 move the gearbox 28 back and forth to utilize the auger sections 31 and 34 in feeding the mining heads into the coal as they rotate the same to mine and remove the coal and to withdraw the mining heads after the auger strings have penetrated to their fullest depth. The gearbox 38 as shown in Fig. 4 occupies the upper portion of the nonrotary barrel 35 that follows the cutter heads and does not in any way interfere with the passage of coal rearwardly through the barrel 35. However, as shown in Figs. 3 and 5 the conveyor blade members 48 are placed on the shafts 40 to 43 respectively for the purpose of insuring that the coal will not become lodged between the cutter heads and the gearbox and for the purpose of initially propelling the coal through the nonrotary barrel 35. Although the auger sections 31 and 34 extend directly to the machine, the intermediate auger units 32 and 33 may be made up of one, two or three auger sections depending upon the fixed length of these sections depending upon how long it takes to have them move the coal from their intermediate position laterally to the auger sections 31 and 34. Thus the number of actual auger sections making up these fixed auger sections 32 and 33 depends upon the character of the coal being mined.

Referring to Figs. 1 and 2 the rear ends of the middle or fixed length auger units 32 and 33 are tied together by the transverse bearing rod member 50 having a bearing 51 and 52 to receive each of the ends of the auger sections 33 and 32 respectively. This bearing member is detachably coupled to the last auger sections of the auger units 32 and 33 and merely holds them in their proper relative position. However, they are otherwise free to swing as a unit within the limits of the tolerances coupling the auger sections. The bearing rod 50 also supports the plow sections 53 and 54 which insure that the last spillage of coal was thrown to the respective outer auger strings 34 and 31 respectively. These plow sections are spaced apart as indicated at 55 so that when the unit is withdrawn from the hole bored, any spillage that remains in the central portion is channeled back to the rotary auger units 32 and 33 and again laterally conveyed to the respective auger sections 31 and 34.

Figure 6:
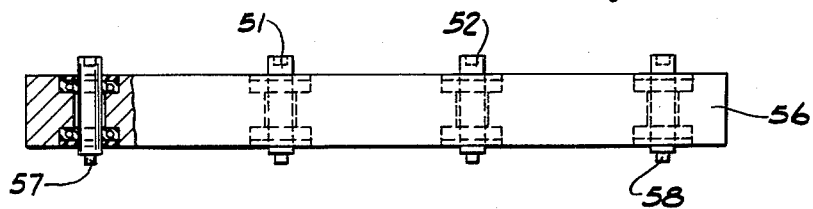
Fig. 6 is a horizontal sectional view showing the long bearing bar of Fig. 3.

The structure shown in Fig. 6 is a modified showing of the bearing bar 56 which not only includes the bearing members 51 and 52 for the intermediate fixed length auger units 32 and 33 but also provides for the bearing members 57 and 58 for the auger string sections 31 and 34 respectively. These bearing units provide a small gap in the conveyor strings and permit the coupling of the auger sections making up the strings 31 and 34 on each side of the bearings 57 and 58 respectively. This construction together with the gear box 38 and the four auger sections 31 to 34 provides a more rigid frame member aft of the mining section and extends the mining head 60 from the rotary cutters to the bearing bar 56.

I claim:

1. An auger mining machine having a plurality of rotatable and axially movable parallel mining auger means connected together at their outer ends by a gear train and a rotary cutter head for each auger means, characterized in that selected of said auger means extend rearwardly to a motor drive on a base frame and the other of said auger means are short, the flight on said short auger means curved to feed their mined material laterally to said selected auger means for rearward travel.

2. The auger mining machine of claim 1 characterized in that said auger means all lie horizontally in the same plane and said selected auger means are the outermost augers, one having a left hand flight and the other a right hand flight.

3. An auger mining machine having a plurality of rotatable and axially movable parallel mining augers connected together at their outer ends by a gear train and a rotary cutter head for each auger, characterized in that selected of said augers extend rearwardly to a motor drive on a base frame and the other of said augers are short and feed their mined material to said selected augers for rearward travel, a transverse bearing bar connecting the other ends of said short augers.

4. An auger mining machine having a plurality of rotatable and axially movable parallel mining augers connected together at their outer ends by a gear train and a rotary cutter head for each auger, characterized in that selected of said augers extend rearwardly to a motor drive on a base frame and the other of said augers are short and feed their mined material to said selected augers for rearward travel, a transverse bearing bar connecting all of said augers at the position of the inner ends of said short augers.

5. An auger mining machine having a plurality of rotatable and axially movable parallel mining augers connected together at their outer ends by a gear train and a rotary cutter head for each auger, characterized in that selected of said augers extend rearwardly to a motor drive on a base frame and the other of said augers are short and feed their mined material to said selected augers for rearward travel, a transverse bearing bar connecting at least said short augers at their inner ends, and plow shave means carried by said bearing bar to move any spillage of the mined material to said selected augers.

6. The auger mining machine of claim 1 characterized by a nonrotary barrel enclosing said gear train and aiding to guide the rotary cutting heads extended in front of said barrel.

7. An auger mining machine comprising right and left hand rotary auger strings providing outer auger strings on the left and right sides of a substantially horizontal machine, an enclosed transverse gear train means extending between the outer ends of said auger strings, a series of rotary cutting heads driven from the front of said gear train means to mine a single hole, short augers intermediate said right and left hand rotary auger strings extending rearwardly from said gear train means and driven by said gear train means, the flights on said short augers curved to feed the mined material laterally to said outer auger strings.

8. The auger mining machine of claim 7 characterized in that the intermediate rotary cutting heads each have an aligned short auger there behind.

9. The auger mining machine of claim 7 characterized in that there are four rotary cutting heads, one for each outer auger string and two intermediate, there being two short augers one right and one left hand for said intermediate rotary cutting heads.

10. An auger mining machine having a plurality of rotatable and axially movable parallel mining augers connected together at their outer ends by a gear train and a rotary cutter head for each auger, characterized in that selected of said augers extend rearwardly to a motor drive on a base frame and the other of said augers are short and feed their mined material to said selected augers for rearward travel, a transverse bearing bar connecting said augers at the position of the inner ends of said short augers, and blade means on said bearing bar in back of each short auger to sweep the spillage to the outer augers.

11. The auger mining machine of claim 10 characterized in that said blade means are spaced apart to deflect any mine material therebetween when being retracted from the mined hole for lateral conveying by the short augers to the outer augers.

12. The auger mining machine of claim 7 characterized in that each of said augers overlaps the adjacent auger.

13. The auger mining machine of claim 1 characterized in that the paths of the outermost cutting portions of adjacent cutting heads overlap each other, and each of said augers just clears its adjacent auger.

14. The auger mining machine of claim 1 characterized in that the paths of the outermost cutting portions of adjacent cutting heads overlap each other, and the perimetral edges of each auger just clears the path of the perimetral edge of its adjacent augers.

References Cited in the file of this patent

FOREIGN PATENTS 22,446    France _____ Jan. 18, 1921
(Addition to No. 498,546)